United States Patent
van Duijnhoven et al.

[19]

[11] Patent Number: 6,166,107

[45] Date of Patent: Dec. 26, 2000

[54] METHOD FOR PRODUCING AN OPTICAL ROD-SHAPED GRADED-INDEX POLYMER PREFORM, PREFORM OBTAINED IN ACCORDANCE WITH THIS METHOD AND OPTICAL LENS AND OPTICAL FIBRE OBTAINED BY USING SAME

[75] Inventors: Franciscus Gerardus Henricus van Duijnhoven, de Helmond; Cornelis Wilhelmus Maria Bastiaansen, HB Maastricht, both of Netherlands

[73] Assignee: Technische University Eindhoven, Eindhoven, Netherlands

[21] Appl. No.: 09/125,155

[22] PCT Filed: Feb. 12, 1997

[86] PCT No.: PCT/NL97/00055

§ 371 Date: Mar. 1, 1999

§ 102(e) Date: Mar. 1, 1999

[87] PCT Pub. No.: WO97/29903

PCT Pub. Date: Aug. 21, 1997

[30] Foreign Application Priority Data

Feb. 13, 1996 [NL] Netherlands .................. 1002317

[51] Int. Cl.$^7$ .................. C08L 83/00; C08F 2/00; C08F 18/20

[52] U.S. Cl. .................. 523/201; 526/62; 526/64; 526/88; 526/245

[58] Field of Search .................. 523/201; 526/62, 526/64, 88, 245

[56] References Cited

U.S. PATENT DOCUMENTS 4,956,000  9/1990  Reeber et al. .................. 65/18.1

FOREIGN PATENT DOCUMENTS

| | | |
|---|---|---|
| 0 145 392 | 6/1985 | European Pat. Off. . |
| 0 497 984 | 8/1992 | European Pat. Off. . |
| 42 14 259 | 7/1993 | Germany . |
| 87/01071 | 2/1987 | WIPO . |
| 92/10357 | 6/1992 | WIPO . |

*Primary Examiner*—Kriellion Sanders
*Attorney, Agent, or Firm*—Finnegan, Henderson, Farabow, Garrett & Dunner, L.L.P.

[57] ABSTRACT

A method for producing optical rod-shaped graded-index polymer preform by making the composition of the preform near the core differ from the composition of the shell of the preform by polymerization with rotation of a mixture containing the starting substances, whereby a mixture comprising various monomers is rotated and that after achieving a distribution of the monomers, the polymerization is carried out with rotation of the mixture, or that a monomer and thermoplastic polymer-containing mixture, whereby said monomer is different from the monomer from which said polymer has been prepared, is rotated and that, after achieving a distribution of said monomer and polymer, the monomer present in said mixture is subsequently polymerized with rotation, in which both cases the rotation is carried out with a diameter dependent rotation velocity, represented by the following general equation: rpm>10,000 d$^{-0.5}$ wherein: rpm=rotation velocity, revolutions per minute d=diameter of the preform (cm). The invention furthermore relates to optical lenses and fibres formed of the polymer preform thus produced.

28 Claims, No Drawings

METHOD FOR PRODUCING AN OPTICAL ROD-SHAPED GRADED-INDEX POLYMER PREFORM, PREFORM OBTAINED IN ACCORDANCE WITH THIS METHOD AND OPTICAL LENS AND OPTICAL FIBRE OBTAINED BY USING SAME

The present invention relates to a method for producing an optical rod-shaped graded-index polymer preform by making the composition of the preform near the core (or centre) differ from the composition of the shell (or cladding) of the preform by polymerization with rotation of the mixture containing the starting substances. The present invention furthermore relates to optical rod-shaped graded-index polymer preform and optical lenses and optical fibres obtained by using such a preform.

A similar method for producing a graded-index polymer preform is known from the article "Review Polymer Optical Fibres", Emslie, C., Journal of Materials Science, 23 (1988), pages 2281–2293. The cross-sectional refractive index gradient of the preform described in said article has been obtained as a result of the fact that the chemical composition of the copolymer gradually changes in cross-sectional direction. The preform is made by transferring a mixture consisting of two monomers and an ultraviolet-sensitive initiator added thereto to a glass tube. Said tube is externally irradiated by ultraviolet light and slowly rotated in order to achieve a uniform irradiation over the circumference of the tube. As a consequence of the limited penetration depth of the ultraviolet light the polymerization process starts near the outside of the tube. The reactivity ratios of the monomers are selected such that one of the monomers preferably polymerizes near the outside of the tube during the early part of the polymerization process. Then the rest of the polymerization process proceeds from the outside of the preform towards the centre thereof, whereby a decreasing amount of the first monomer and an increasing amount of the second monomer is being polymerized. The chemical composition of the preform gradually changes from the outside of the preform towards the centre of the preform, therefore, and the preform consists of a very large number of different copolymers of different chemical compositions. In addition to that it is possible to further optimize the optical properties of the preform by using a third monomer, as a result of which a more uniform refractive index profile is obtained. The maximum diameter of the rod-shaped preform produced in accordance with said method is limited, because the second monomer must diffuse inwardly during polymerization. As a result of this the polymerization process must take place slowly, which in practice limits the maximum diameter.

The international application WO 92/10357 relates to method and apparatus for in situ preparing a plastic lens element having a gradient index of refraction. According to this method first and second monomer-containing compositions, each having a different index of refraction, are injected into a centrifugal mould at a controlled ratio to produce a lens element having a gradient index of refraction. Precise control of the gradient index is achieved by varying the ratio of the two monomers over a predetermined number of steps during the filling process. After filling of the central cavity, the spin mould is irradiated with ultraviolet light (UV) to induce photopolymerization and to form a hardened lens. According to this method a gradient index lens element measuring 9.5 mm long by 7.58 mm diameter was obtained.

The German patent DE-C1-42 14 259 relates to a method for in situ preparation of optical preforms having a gradient index of refraction. A homogeneous mixture of components with different molecular weights is melted in a mould and subsequently rotated to cause a separation of the molecular components due to the rotation forces. After achieving the intended distribution the temperature is decreased and the gradient is fixed. This patent does not mention a reaction between the components.

The international application WO 87/01071 relates to a preform with a graded refractive index and a method for construction of the same. According to this application a graded index is obtained by bringing together monomers with almost identical reaction parameters and solubility parameters, but with different refractive indices while continuously changing the mol ratio of the monomers. This is achieved by supplying a monomer or monomers with the lowest refractive index to start with and the refractive index is thereafter increased with a continual alteration of the mole quantities of monomers $M_1$ en $M_2$. Experience has shown that it is possible to choose rotation speeds between 500 and 2000 rpm, preferably around 1000 rpm. At the end there will be a small cavity around the canula which is without polymers. The cavity is filled with the final monomer mixture, i.e. the monomer or the monomer mixture which has the highest refractive index. Then the preform is polymerized once again until polymerization is even.

Optical graded-index polymer preform wherein the refractive index in the core differs from that at the shell is in particular suitable for applications which require a high data transmission capacity, in particular in computer networks. Pulse widening of the output signal is prevented by introducing a cross-sectional refractive index gradient in the optical polymer preform, i.e. fibres obtained by further processing the optical polymer preform. The light beams propagating on the axis have the shortest path length but the lowest speed, because the refractive index is highest on the axis of the preform. Light beams that follow a characteristic sinusoidal path have a greater path length but a higher speed, because they mainly propagate in areas which have a lower refractive index, namely at the shell of the preform. Pulse widening is prevented by introducing a refractive index gradient, as a result of which the data transmission capacity is increased.

Surprisingly it has been found that rod-shaped, cross-sectional graded-index polymer preform having a large diameter (0.01–0.5 m) can be made from mixtures of two polymers. In addition to that it has been found that said rod-shaped cross-sectional graded-index polymer preform can be made on the one hand from a mixture consisting of a polymer in a monomer or a mixture of monomers, or on the other hand from a mixture of monomers, by rotating and polymerizing said mixture, whereby short polymerization periods may be used in combination with large diameters of the preform to be produced.

The method according to the invention as referred to in the introduction is characterized in that a mixture comprising various monomers is rotated and that after achieving a distribution of said monomers, the polymerization is carried out with rotation of the mixture, or that a monomer and thermoplastic polymer-containing mixture, whereby said monomer is different from the monomer from which said polymer has been prepared, is rotated and that, after achieving a distribution of said monomer and polymer, the monomer present in said mixture is subsequently polymerized with rotation, in which both cases the rotation is carried out with a diameter dependent rotation velocity, represented by the following general equation:

$$\text{rpm} > 10{,}000 \ d^{-0.5}$$

wherein:
rpm=rotation velocity, revolutions per minute
d=diameter of preform (cm).

The distribution of the polymer or the monomer in said monomer or mixture or monomers results from the gravitation field, after which polymerization with rotation of the monomer or mixture of monomers in the mixture takes place and the second polymer is formed in order to fix the composition gradient, i.e. the distribution of two polymers, of the rod-shaped preform.

Preferably the polymer present in the mixture has a higher density than the monomer or the polymer formed from said monomer. As a result of this difference in density the concentration of the monomer in the mixture will be highest in the core during said rotation.

According to the invention it has now become possible to produce optical graded-index polymer preform wherein said preform is built up of two homopolymers, as a result of which the occurrence of pulse widening is minimized and the data transmission capacity is increased. Moreover, in accordance with the method of the present invention it is possible to produce rod-shaped cross-sectional graded-index polymer preform having a large diameter, viz. 0.01–0.5 m. The fibres obtained from such preform may be spun to have a great length (>100 m), which fibres may be processed to form flat lenses, whereby a large series of lenses is obtained in one step.

The forming of rod-shaped symmetrical graded-index preform is known from the article "High bandwidth gradient index optical fibres" by Koike et al. In accordance with the method described in said article a tube of polymethyl methacrylate (PMMA) is made by polymerizing a mixture of methyl methacrylate, an initiator and a chain-transferring agent in a glass tube while rotating same at 3000 revolutions per minute at a temperature of 70° C. The PMMA tube thus obtained is subsequently filled with a mixture of methyl methacrylate, an initiator, a chain-transferring agent and a low-molecular organic compound which does not polymerize and which has a higher refractive index than the PMMA tube. The methyl methacrylate in the tube is polymerized at 50 revolutions per minute in an oven at 95° C. As a result of the Thomsdorff effect the polymerization process starts at the outside of the rod-shaped preform and gradually proceeds towards the inside of the tube. During the polymerization process the organic compound (bromo benzene/benzyl benzoate) is diffused towards the inside of the rod, as a result of which the concentration of the organic compound and thus the refractive index gradually becomes higher in the direction of the axis of the rod-shaped preform. The polymerization of the monomer must take place slowly in order to have the low-molecular organic compound diffuse in the direction of the axis of the rod-shaped preform, as a result of which long polymerization periods are required. Said polymerization periods quickly become longer as the diameter of the rod-shaped preform becomes larger, and as a result of this only rod-shaped preform having a maximum diameter of about 0.01 m can be formed. As a consequence of this the length of the fibres which can be produced from said rod-shaped preform is limited (max. 100 m), which reduces the practical usability of this method for the production of fibres having a larger diameter (>0.25 mm).

It is preferred to use a tube made of one of the polymers. The use of a tube made of one of the polymers in the method according to the present invention ensures that after the monomer-containing mixture has been transferred to said polymer tube the distribution of the monomer and polymer across the cross-sectional of the intended preform is quickly effected by rotation thereof as a result of back diffusion of the polymer towards the axis, because the desired composition has already been realized at the outside or shell of the preform. In another embodiment a polymer and monomer mixture is transferred to the polymer tube that has already been formed, whereby the polymer corresponds with the composition of the polymer tube. The use of a high number of revolutions, a high gravitation field and a mixture consisting of a polymer in a monomer or a mixture of monomers for generating such a concentration gradient, i.e. a distribution of the starting substances, in the mixture ensures that the time scale required for generating such a concentration gradient, i.e. a distribution of the starting substances, is reduced, as a result of which rod-shaped preform having a large diameter (0.01–0.5 m) can be obtained after polymerization of the monomer.

Preferably the tube is made by polymerization with rotation of the monomer from which the polymer is prepared. More in particular a polymer tube in gelled condition is used, whereby said tube consists of a polymer and monomer mixture.

The advantage of producing a tube with rotation is that a tube having precise inside and outside diameter dimensions is obtained, which is of importance for its further use. It is preferred to use a polymer tube in gelled condition, because this facilitates the back diffusion of the polymer to the axis of the preform during rotation.

In a preferred embodiment the refractive index of the polymer present in the mixture is lower than the refractive index of the polymer formed after polymerization with rotation of the monomer present in the mixture. In such an embodiment a preform having a radial gradient index of refraction is obtained, in which preform the highest refractive index is present in the core of said preform. In special applications it is preferred that the refractive index of the polymer in the mixture is higher than the refractive index of the polymer formed after polymerization with rotation of the monomer present in the mixture. In such an embodiment a preform having a radial gradient index of refraction is obtained, in which preform the highest refractive index is present at the cladding of said preform. According to the method of the present invention it is possible to produce optical graded polymer preforms having a graded refractive index in the axial direction of the preform.

In another preferred embodiment no phase separation takes place between the polymer present in the mixture and the polymer formed after polymerization with rotation of the monomer present in the mixture. The polymers have been mixed on a molecular scale in the rod-shaped polymer preform. It is important to prevent phase separation in order to prevent the occurrence of light diffusion or light scattering, which would make the optical loss too great.

The polymer present in the mixture and the polymer formed after polymerization with rotation of the monomer present in the mixture are preferably amorphous polymers, this in order to meet the optical requirements (transparency) of the preform.

In another preferred embodiment the polymer present. in the mixture and the polymer formed after polymerization with rotation of the monomer present in the mixture are thermoplastic polymers.

The use of thermoplastic materials makes it possible to further process the optical polymer preform produced in accordance with the method of the present invention to form fibres by means of a simple fibre spinning technique. The fibres being spun may be used as optical fibres or, after being cut with a hot knife, as lenses. The further processing of fibres by spinning is a technique which is known per se and does not form part of the present invention. The graded-index optical fibres produced in accordance with the present invention are suitable for use in computer networks. In addition to that the polymer flat lenses produced from said fibres are suitable for use in fax machines and copying equipment.

The polymer used in the mixture is preferably a fluorinated polyacrylate or a fluorinated polymethacrylate, such as polytetrafluoro propyl methacrylate (PTFPMA), and the monomer used in the mixture is preferably acryl ate or methacryl ate, such as methyl methacryl ate (MMA).

The polymethyl methacrylate (PMMA) formed from methyl methacrylate (MMA) and PTFPMA are amorphous thermoplastic polymers and fully miscible, the two polymers have different refractive indices, viz. 1.490 for PMMA and 1.434 for PTFPMA. Optical graded-index polymer preform which can be suitably used for optical lenses or optical fibres is obtained by using a mixture consisting of methyl methacrylate and polytetrafluoro propyl methacrylate.

It is preferred to use a polymer and monomer-containing mixture, whereby the weight fraction of polymer ranges between 10 and 60% by weight based on the weight of the polymer and the monomer. It is preferred to use a high weight fraction of polymer in the polymer and monomer-containing mixture, because this reduces the amount of polymerization heat which is released upon polymerization of the monomer or mixture of monomers, as a result of which a short polymerization period can be achieved.

In accordance with the method of the present invention the distribution of the starting substances present in the mixture is achieved by rotating the monomer and polymer-containing mixture, or the mixture of various monomers, with a diameter dependent rotation velocity, represented by the following equation:

$$\text{rpm} > 10{,}000 \ d^{-0.5}$$

wherein:

rpm=rotation velocity, revolutions per minute d=diameter of preform (cm)

From experiments it appeared that the minimum rotation velocity is dictated by the diameter of the preform. In the embodiment of a preform diameter of 0.5 cm the rotation velocity must be at least 14,000 revolutions per minute. In the embodiment of a preform diameter of 5.0 cm the minimum rotation velocity is 4500 revolutions per minute. It must be clear that a rotation velocity which does not meet the above requirements set by the equation of the diameter dependent rotation velocity can never be used to achieve the desired distribution of the starting substances.

During the rotation period in order to achieve a distribution of the starting substances present in the mixture, the temperature is set such that no polymerization of the monomer present in the mixture will take place. After the distribution has been achieved polymerization with rotation of the monomer or monomers present in the mixture takes place, preferably by raising the temperature of the mixture. During said polymerization with rotation the number of revolutions is adjusted. Following said polymerization with rotation, postcuring of the polymerized mixture takes place at a temperature of max. 140° C.

The monomer or mixture of monomers is polymerized by standard techniques which are usual for the polymerization of the respective monomers or mixtures of monomers. Prior to polymerization the usual additives, such as initiators, inhibitors, chain-transferring agents and the like are added to the mixture comprising various monomers or the polymer in the monomer or mixture of monomers. The polymerization of the monomer or the mixture of monomers may be started immediately after the desired number of revolutions of the solution during rotation is reached. In the present method it is preferred, however, to rotate for a particular period of time without any polymerization of the monomer or mixture of monomers occurring, in order to generate a particular concentration gradient, i.e. a distribution of the starting substances present in the mixture, after which fixation of the concentration gradient, i.e. the distribution of the starting substances present in the mixture, takes place by polymerization of the monomer or mixture of monomers.

When acrylates or methacrylates are used as the monomer or mixture or monomers, the polymerization of the monomer or mixture of monomers may take place under gamma irradiation, electron irradiation, irradiation with ultraviolet light or under heating. In the case of polymerization under ultraviolet light or under heating a suitable initiator must be added to the mixture. In the case of polymerization by means of ultraviolet light the polymerization process may be started at any time by irradiating a glass tube containing the mixture of the polymer in a monomer or mixture of monomers and a ultraviolet light-sensitive initiator with light of a suitable wavelength. In the case of a thermosensitive initiator the polymerization process may be started by raising the temperature of the solution of the polymer in the monomer or mixture of monomers during rotation. Furthermore it is possible to carry out a thermally induced polymerization under isothermal conditions by adding a suitable amount of an inhibitor to the solution of the polymer. Said inhibitor is first exhausted, and subsequently polymerization of the monomer of the mixture of monomers takes place.

The present invention will be explained in more detail by means of the examples below.

Starting substances

The following starting substances were used.

MMA—Methyl methacrylate (marketed by Aldrich Chemical Co.)

TFPMA—Tetrafluoro propyl methacrylate (marketed by Aldrich Chemical Co.)

Tert-butyl cumyl peroxide (Trigonox-T, marketed by Akzo/Nobel Chemicals Ltd.)

Azoisobisbutyronitrile (AIBN, marketed by Akzo/Nobel Chemicals Ltd.)

n-butyl mercaptan (n-BM, marketed by Aldrich Chemical Co.)

PTFPMA—Polytetrafluoro propyl methacrylate

DTBP—di-tert-butyl peroxalate

All examples and comparative examples have been carried out using a preform diameter of 0.5 cm.

EXAMPLE 1

In this example a monomer and polymer-containing mixture was used for producing the optical graded-index polymer preform. The polymer PTFPMA was prepared by subjecting TFPMA to bulk polymerization in a glass tube under a nitrogen atmosphere. The initiator (Triganox-T, 0.1 mol. %) and the chain-transferring agent (n-BM, 0.4–1.2 mol. %) were added to TFPMA and the polymerization was carried out at 80° C. for 24 hours.

For the preparation of solutions various amounts of the thus prepared polymer PTFPMA (10, 20, 30 and 40% by weight respectively, based on the weight of the eventual preform) were then dissolved in methyl methacrylate (MMA), to which an initiator (AIBN, 0.2% by weight, based on the weight of the intended preform) and a chain-transferring agent (n-BM, 0.25% by weight, based on the weight of the intended preform) were added. The solutions obtained were rotated in a vertically positioned glass tube in an ultracentrifuge at 20,000 rpm and room temperature for 4 hours in order to obtain the desired distribution of the polymer PTFPMA and the monomer MMA over the cross-section of the preform. After said distribution of the starting substances was obtained the monomer was polymerized at 20,000 rpm and 60° C., after which the temperature of the polymerized mixture was raised to 130° C. This temperature was maintained for 12 hours. According to this method optical graded-index polymer preform was obtained, with the gradient being influenced, that is, imparted a sharper profile, by increasing the PTFPMA-content. From the general equation of the diameter dependent rotation velocity it follows that the minimum rotation velocity for a preform diameter of 0.5 cm is at least 14,000. Therefore, the rotation velocity as used in this example is according to the present invention.

COMPARATIVE EXAMPLE 1

A solution of PTFPMA in MMA (30% by weight/by weight), to which an initiator (Triganox-T, 0.1 mol. %) and a chain-transferring agent (n-BM, 0.4–1.2 mol. %) was added, was rotated in a vertical tube at 50 rpm for 4 hours. Then the monomer was polymerized at 50 rpm and 60° C., after which the temperature was raised to 130° C. for 12 hours. This resulted in a rod-shaped polymer preform which did not exhibit a refractive index gradient. From the general equation of the diameter dependent rotation velocity it follows that the rotation velocity as used in this experiment is lower than the rotation velocity required by the present invention.

COMPARATIVE EXAMPLE 2

The same solution as in comparative example 1 was used, and this solution was rotated in a vertical tube at 250 rpm for 4 hours. Then the monomer was polymerized at 250 rpm and 60° C., after which the temperature was raised to 130° C. for 12 hours. This resulted in a rod-shaped polymer preform which did not exhibit a refractive index gradient. From the general equation of the diameter dependent rotation velocity it follows that the rotation velocity as used in this experiment is lower than the rotation velocity required by the present invention.

EXAMPLE 2

In this example a tube was first made from the polymer PTFPMA, after which the monomer-, that is, methyl methacrylate, containing mixture was transferred to the tube and polymerization with rotation was carried out.

The preparation of the polymer PTFPMA was carried out with rotation. Various amounts of PTFPMA (10, 20, 30, 40 and 50% by weight, based on the weight of the preform to be obtained) were used for preparing various mixtures, whereby an initiator (AIBN, 0.2% by weight, based on the weight of the intended preform) and a chain-transferring agent (n-BM, 0.25–0.5% by weight, based on the weight of the intended preform) was added. The bulk polymerization of each mixture took place in a horizontally positioned glass tube in a centrifuge at 5000 rpm and 70° C. for 24 hours. Polymer tubes having the same outside diameter and varying inside diameters were obtained by polymerizing mixtures containing various amounts of PTFPMA in a gravitation field.

A mixture of an initiator (AIBN, 0.2% by weight, based on the weight of the intended preform) and a chain-transferring agent (n-BM, 0.25% by weight, based on the weight of the eventual preform) dissolved in methyl methacrylate was poured into each of the PTFPMA tubes thus prepared. The tubes filled in this manner were rotated in vertical position in a centrifuge at 20,000 rpm and room temperature for 4 hours in order to achieve the desired disstribution. After said distribution was obtained, polymerization with rotation of the monomer present in the mixture was carried out at 20,000 rpm and 60° C., after which the polymerized mixture was heated at 130° C. for 12 hours for postcuring. From the general equation of the diameter dependent rotation velocity it follows that the minimum rotation velocity for a preform diameter of 0.5 cm is at least 14,000. Therefore, the rotation velocity as used in this example is according to the present invention.

COMPARATIVE EXAMPLE 3

In this example a tube was first prepared from the polymer PTFPMA in a similar manner as in example 2, after which the monomer-containing mixture was transferred to the prepared polymer tube (built up of 30% by weight of TFPMA, based on the weight of the preform) and subsequently maintained at room temperature for 4 hours without rotation. Then the monomer (MMA) was polymerized at 60° C. without rotation, after which the rod-shaped polymer preform obtained was heated at 130° C. for 12 hours. The preform thus obtained did not exhibit a refractive index profile. From the general equation of the diameter dependent rotation velocity it follows that the rotation velocity as used in this experiment is lower than the rotation velocity required by the present invention.

COMPARATIVE EXAMPLE 4

The method corresponds with comparative example 3, except that the polymerization was carried out at 90° C. An optical preform exhibiting a homogeneous refractive index over the entire cross-section of the preform was obtained. From the general equation of the diameter dependent rotation velocity it follows that the rotation velocity as used in this experiment is lower than the rotation velocity required by the present invention.

COMPARATIVE EXAMPLE 5

In this example a tube was first prepared from the polymer PTFPMA in a similar manner as in example 2, after which the monomer-containing mixture was transferred to the prepared polymer tube (built up of 30% by weight of TFPMA, based on the weight of the preform) and subsequently rotated at 250 rpm at room temperature for 4 hours. After polymerization with rotation of the mixture at 250 rpm and a temperature of 60° C. the rod-shaped polymer preform thus obtained was heated at 130° C. for 12 hours. The preform did not exhibit a refractive index profile at all or a weak profile or a stepped profile, depending on the dimensions of the PTFPMA tube. From the general equation of the diameter dependent rotation velocity it follows that the rotation velocity as used in this experiment is lower than the rotation velocity required by the present invention.

EXAMPLE 3

In this example a tube was first prepared from the polymer PTFPMA in a similar manner as in example 2, after which the monomer-containing mixture was transferred to the prepared polymer tube and polymerization with rotation was carried out, with this difference that in this example a polymer tube in gelled condition was used.

Mixtures containing various amounts of PTFPMA (10, 20, 30, 40 and 50% by weight, based on the weight of the intended preform) were prepared and initiators (DTBP and AIBN, both in an amount of 0.1% by weight, based on the weight of the intended preform) and a chain-transferring agent (n-BM, 0.25% by weight, based on the weight of the eventual preform) was added thereto. The bulk polymerization of the mixtures thus obtained took place in a horizontally positioned glass tube in a centrifuge at 5000 rpm and 20° C. for 24 hours. Polymerization under the aforesaid conditions resulted in PTFPMA tubes with the polymer being in gelled condition.

A mixture of an initiator (AIBN, 0.2% by weight, based on the weight of the intended preform), a chain-transferring agent (n-BM, 0.25% by weight, based on the weight of the intended preform) and methyl methacrylate was poured into each of the gelled PTFPMA tubes thus prepared. The tubes thus filled were rotated in vertical position in a centrifuge at 20,000 rpm and room temperature for 4 hours. The distribution of the starting substances over the cross-section of the preform thus obtained was subsequently fixed at 20,000 rpm and 60° C. by polymerization of the monomer present in the mixture, after which the polymerized mixture was heated at 130° C. for 12 hours for postcuring.

From the above examples it appears that it is very well possible to produce optical graded-index polymer preform by introducing the concentration gradient, i.e. the distribution of the starting substances present in the mixture, by rotating a monomer and polymer-containing mixture and subsequently polymerizing the monomer present in the mixture. From the general equation of the diameter dependent rotation velocity it follows that the minimum rotation velocity for a preform diameter of 0.5 cm is at least 14,000. Therefore, the rotation velocity as used in this example is according to the present invention.

EXAMPLE 4

In this example a monomer-containing mixture was used for producing the optical graded-index polymer preform. The monomer methyl methacrylate (MMA) was mixed with various amounts of the monomer tetrafluoro propyl methacrylate (TFPMA) (10, 20, 30, 40, 50% by weight, based on the weight of the preform to be obtained). The mixture of monomers was rotated in a vertically positioned glass tube in an ultracentrifuge at 50,000 rpm and room temperature for 8 hours in order to obtain the desired distribution of the starting substances over the cross-section of the preform. After said concentration gradient was obtained the monomers were polymerized at 50,000 rpm and 60° C. Then the temperature of the polymerized mixture was raised to 130° C. and maintained at this level for 12 hours. In accordance with this method a rod-shaped optical graded-index polymer preform was obtained. From the general equation of the diameter dependent rotation velocity it follows that the rotation velocity as used in this experiment is according to the rotation velocity required by the present invention.

EXAMPLE 5

In this example a tube was first prepared from the polymer PTFPMA in a similar manner as in example 2, after which the monomer-containing mixture was transferred to the prepared polymer tube (built up of 35% by weight of TFPMA, based on the weight of the preform) and subsequently rotated at 20,000 rpm and at room temperature for one hour, said rotating period being shorter than the four hour period of example 2. After the distribution of the monomer and polymer was obtained, polymerization with rotation of the monomer present in the mixture was carried out at 20,000 rpm and 60° C., after which the polymerized mixture was heated at 130° C. for 12 hours for postcuring. From the general equation of the diameter dependent rotation velocity it follows that the minimum rotation velocity for a preform diameter of 0.5 cm is at least 14,000. Therefore, the rotation velocity as used in this example is according to the present invention.

EXAMPLE 6

This method corresponds with example 5, except that the polymer tube was built up of 55% by weight of TFPMA, based on the weight of the preform. From the general equation of the diameter dependent rotation velocity it follows that the minimum rotation velocity for a preform diameter of 0.5 cm is at least 14,000. Therefore, the rotation velocity as used in this example is according to the present invention. The refractive index of the preform according to example 5 exhibited a higher value for the refractive index in the core of the preform than the refractive index of the preform obtained according to example 6.

EXAMPLE 7

This method corresponds with example 3, except that the prepared polymer tube (built up of 40% by weight of TFPMA, based on the weight of the preform) was rotated during a period of 2 hours. The obtained preform exhibited a parabolic profile for the refractive index.

EXAMPLE 8

In this example an optical graded-index polymer preform was made, in which preform the gradient of refractive index is present along the length or axis of the preform. The polymer PTFPMA is prepared by subjecting TFPMA to bulk polymerization in a glass tube under a nitrogen atmosphere. The initiator (Triganox-T, 0.1 mol %) and the chain-transferring agent (n-BM, 0.4–1.2 mol %) were added to TFPMA and the polymerization was carried out at 80° C. for 24 hours.

For the preparation of solutions various amounts of the thus prepared polymer PTFPMA (10, 20, 30 and 40% by weight respectively, based on the weight of the intended preform) were then dissolved in methyl methacrylate, to which an initiator (AIBN, 0.2% by weight, based on the weight of the intended preform) and a chain-transferring agent (n-BM, 0.25% by weight, based on the weight of the intended preform) were added. The solutions thus obtained were rotated in a horizontally, not in the rotation-axis positioned tube in a centrifuge provided with a swing-out bucket rotor at 15,000 rpm and room temperature for 6 hours in order to obtain the desired distribution of the starting substances. After said desired distribution of the starting substances was obtained the monomer MMA was polymerized at 15,000 rpm and 60° C., after which the temperature of the polymerized mixture was raised to 130° C. This temperature was maintained for 12 hours. According to this method optical graded-index polymer preforms were obtained, with the gradient index of refraction across the length of the preform.

EXAMPLE 9

This method corresponds with example 8, except that the preparation of the polymer PTFPMA was carried out under rotation. Various amounts of TFPMA (10, 20, 30, 40, 50% by weight respectively, based on the weight of the intended preform) were used and initiator (AIBN, 0.2% by weight) and chain-transferring agent (n-BM, 0.25–0.5% by weight) were added to each mixture. The bulk polymerization of the mixtures thus obtained took place in a horizontally, not in the rotation-axis positioned glass tube in a centrifuge provided with a swing-out bucket rotor at 5000 rpm and 70° C. for 24 hours. According to this method a "disk" of PTFPMA was obtained.

On each of the thus prepared PTFPMA disks a mixture of an initiator (AIBN, 0.2% by weight) and a chain-transferring agent (n-BM, 0.25% by weight), dissolved in MMA, was poured and rotated in a horizontally positioned glass tube in a centrifuge provided with a swings out bucket rotor at 15,000 rpm and room temperature for 4 hours in order to obtain the desired distribution of the starting substances. After achieving the desired distribution the monomer present in the mixture was polymerized with rotation at 15,000 rpm and 60° C., after which the polymerized mixture was heated at 130° C. for 12 hours for postcuring.

EXAMPLE 10

This method corresponds with example 9, except that various disks of PTFPMA in gelled condition were used.

Mixtures containing various amounts of TFPMA (10, 20, 30, 40 and 50% by weight, based on the weight of the intended preform) were prepared and an initiator (DTBP, 0.2% by weight) and a chain-transferring agent (n-BM, 0.25–0.5% by weight) were added to each mixture. The bulk polymerization of the mixtures thus obtained took place in a horizontally, not in the rotation axis positioned glass tube in a centrifuge provided with a swing-out bucket rotor at 5000 rpm and 20° C. for 24 hours. Polymerization under the aforesaid conditions resulted in PTFPMA disks with the polymer being in gelled condition.

A mixture of an initiator (AIBN, 0.2% by weight), a chain-transferring agent (n-BM, 0.25% by weight) and methyl methacrylate was poured onto each of the gelled PTFPMA disks thus prepared. In order to achieve the desired distribution of the starting substances the mixture was rotated in a horizontal position in a centrifuge provided with a swing-out bucket rotor at 15,000 rpm and room temperature for 4 hours. The distribution thus obtained was subsequently fixed at 15,000 rpm and 60° C. by polymerization of the monomer present in the mixture, after which the polymerized mixture was heated at 130° C. for 12 hours for postcuring. According to this example optical graded-index polymer preforms having a refractive index along the length or the axis of the preform were obtained.

What is claimed is:

1. A method for producing an optical rod-shaped graded-index polymer preform by making the composition of the preform near the core differ from the composition of the shell of the preform by polymerization with rotation of a mixture containing the starting substances, characterized 1) in that a mixture comprising various monomers is rotated and that after achieving a distribution of said monomers, the polymerization is carried out with rotation of the mixture, or 2) in that a monomer and thermoplastic polymer-containing mixture, whereby said monomer is different from the monomer from which said polymer has been prepared, is rotated and that, after achieving a distribution of said monomer and polymer, the monomer present in said mixture is subsequently polymerized with rotation, in which in both cases 1) and 2) the rotation is carried out with a diameter dependent rotation velocity, represented by the following general equation:

$$rpm > 10,000 \, d^{-0.5}$$

wherein:

rpm=rotation velocity, revolutions per minute d=diameter of the preform (cm).

2. A method according to claim 1, wherein the polymer present in said mixture has a higher density than the monomer or the polymer formed from said monomer.

3. A method according to claim 1, wherein a tube made of one of the polymers is used.

4. A method according to claim 3, wherein said tube is formed by polymerization with rotation of the monomer from which said polymer is prepared.

5. A method according to claim 4, wherein said polymer tube is in gelled condition.

6. A method according to claim 1, wherein the refractive index of the polymer in said mixture is lower than the refractive index of the polymer formed after polymerization with rotation of the monomer present in the mixture.

7. A method according to claim 1, wherein the refractive index of the polymer in said mixture is higher than the refractive index of the polymer formed after polymerization with rotation of the monomer present in the mixture.

8. A method according to claim 1, wherein no phase separation takes place between the polymer present in the mixture and the polymer formed after polymerization with rotation of the monomer present in the mixture.

9. A method according to claim 1, wherein the polymer present in the mixture and the polymer formed after polymerization with rotation of the monomer present in the mixture are amorphous polymers.

10. A method according to claim 1, wherein the polymer present in the mixture and the polymer formed after polymerization with rotation of the monomer present in the mixture are thermoplastic polymers.

11. A method according to claim 1, wherein the polymer used in the mixture is fluorinated acrylates or fluorinated methacrylates.

12. A method according to claim 11, wherein the polymer used in the mixture is polytetrafluoro propyl methacrylate.

13. A method according to claim 1, wherein acrylates or methacrylates are used as the monomer or mixture of monomers.

14. A method according to claim 13, wherein the monomer used in the mixture is methyl methacrylate.

15. A method according to claim 1, wherein said rotation is carried out at at least 10,000 revolutions per minute with a preform diameter of 1.0 cm.

16. A method according to claim 1, wherein said distribution of the starting substances is achieved at a temperature at which no polymerization of the monomer takes place.

17. A method according to claim 1, wherein said polymerization with rotation is carried out by raising the temperature.

18. A method according to claim 1, wherein postcuring of the polymerized mixture at a temperature of max. 140° C. takes place following said polymerization with rotation.

19. Rod-shaped graded-index polymer preform obtainable according to the method disclosed in claim 1, wherein said polymer consists of a mixture of various polymers, the composition of said mixture being such that said preform exhibits a substantially symmetrical cross-sectional refractive index gradient, wherein said preform has a diameter of 0.02–0.5 m and a length(l)/diameter(d) (l/d) ratio of 10–50.

20. A preform according to claim 19, wherein the refractive index of the shell of said preform is higher than the refractive index in the core of said preform.

21. A preform according to claim 19, wherein the refractive index of the shell of said preform is lower than the refractive index in the core of said preform.

22. A preform according to claim 19, wherein acrylates or methacrylates are used as the monomer or mixture of monomers for forming said polymer.

23. A preform according to claim 19, wherein the polymer used is a fluorinated polyacrylate or polymethacrylate.

24. A rod-shaped graded-index polymer preform obtainable according to the method disclosed in claim 1, wherein said preform exhibits a refractive index gradient along the length of said preform.

25. A preform according to claim 24, wherein acrylates or methacrylates are used as the monomer or mixture of monomers for forming said polymer.

26. A preform according to claim 24, wherein the polymer used is a fluorinated polyacrylate or polymethacrylate.

27. An optical lens formed by using the preform according to any one of claims 1, 19 or 24.

28. An optical fibre formed by using the preform according to any one of claims 1, 19 or 24.

\* \* \* \* \*